(12) United States Patent
Nie et al.

(10) Patent No.: US 11,756,206 B2
(45) Date of Patent: Sep. 12, 2023

(54) RECOGNITION METHOD AND DEVICE FOR ANALYZING A STARVATION EXTENT OF A WHITELEG SHRIMP BASED ON UNDERWATER IMAGING

(71) Applicants: ZHEJIANG UNIVERSITY, Hangzhou (CN); ZHEJIANG MARICULTURE RESEARCH INSTITUTE, Wenzhou (CN)

(72) Inventors: Pengcheng Nie, Hangzhou (CN); Yong He, Hangzhou (CN); Guoquan Zeng, Hangzhou (CN); Chengyong Cai, Hangzhou (CN); Junqi Yu, Hangzhou (CN); Hui Zhang, Hangzhou (CN); Jianzhong Ma, Hangzhou (CN); Chen Chen, Hangzhou (CN); Maocang Yan, Hangzhou (CN)

(73) Assignees: Zhejiang University, Hangzhou (CN); Zhejiang Mariculture Research Institute, Wenzhou (CN)

( * ) Notice: Subject to any disclaimer, the term of this patent is extended or adjusted under 35 U.S.C. 154(b) by 175 days.

(21) Appl. No.: 17/228,104

(22) Filed: Apr. 12, 2021

(65) Prior Publication Data
US 2021/0319562 A1    Oct. 14, 2021

(30) Foreign Application Priority Data

Apr. 13, 2020   (CN) .......................... 202010286454.5

(51) Int. Cl.
*G06T 7/13*   (2017.01)
*G06T 7/12*   (2017.01)
(Continued)

(52) U.S. Cl.
CPC .............. *G06T 7/13* (2017.01); *G06T 5/002* (2013.01); *G06T 5/20* (2013.01); *G06T 7/12* (2017.01);
(Continued)

(58) Field of Classification Search
CPC .. G06T 7/13; G06T 5/002; G06T 5/20; G06T 7/12; G06T 7/246; G06T 7/292;
(Continued)

(56) References Cited

U.S. PATENT DOCUMENTS 8,606,014 B2 * 12/2013 Matsuda ................... G06T 7/11
    382/166
11,282,199 B2 * 3/2022 Brenner ................ G06V 10/82
(Continued)

*Primary Examiner* — Bobbak Safaipour
*Assistant Examiner* — Benedict E Lee
(74) *Attorney, Agent, or Firm* — Weiss & Moy, PC; Jeffrey D. Moy

(57) ABSTRACT

It is provided a recognition device for analyzing a starvation extent of a whiteleg shrimp based on underwater imaging, including a bracket, a camera mounted on a top of the bracket, a plurality of light sources for illumination, and a processor connected with the camera. The processor receives a shrimp image collected by the camera, extracts an edge image of the shrimp after the collected shrimp image is preprocessed, and calculates a movement speed of the shrimp and a quantity of baits after a head and a tail are recognized, to recognize starvation extent of the shrimp. It is also provided a recognition method for analyzing starvation extent of the whiteleg shrimp based on underwater imaging. The present disclosure may guide feeders to feed and realize reasonable culture for the shrimp, by capturing images of the shrimp in time and determining starvation the extent of shrimp.

9 Claims, 4 Drawing Sheets

(51) Int. Cl.
  *G06T 7/292* (2017.01)
  *G06T 7/246* (2017.01)
  *G06T 7/90* (2017.01)
  *G06T 5/00* (2006.01)
  *G06T 5/20* (2006.01)
  *G06V 40/10* (2022.01)
  *H04N 23/74* (2023.01)

(52) U.S. Cl.
  CPC ............ *G06T 7/246* (2017.01); *G06T 7/292* (2017.01); *G06T 7/90* (2017.01); *G06V 40/10* (2022.01); *H04N 23/74* (2023.01); *G06T 2207/20132* (2013.01)

(58) Field of Classification Search
  CPC ............ G06T 7/90; G06T 2207/20132; G06T 7/0004; G06T 2207/10016; G06T 2207/10024; G06T 2207/20032; G06T 2207/20081; G06T 7/11; G06T 7/136; G06T 7/187; G06T 2207/20024; G06T 2207/30242; G06V 40/10; G06V 10/26; G06V 10/30; G06V 10/44; G06V 20/05; H04N 5/2354; H04N 7/185; A01K 61/59
  See application file for complete search history.

(56) References Cited

U.S. PATENT DOCUMENTS

| | | | |
|---|---|---|---|
| 2007/0177817 A1* | 8/2007 | Szeliski | G06T 5/002 |
| | | | 382/162 |
| 2009/0034789 A1* | 2/2009 | Wang | G08G 1/04 |
| | | | 382/103 |
| 2019/0021292 A1* | 1/2019 | Hayes | A01K 63/06 |
| 2020/0113158 A1* | 4/2020 | Rishi | A01K 61/60 |
| 2020/0394811 A1* | 12/2020 | Kitagawa | G06V 20/52 |
| 2021/0212298 A1* | 7/2021 | Messana | A01K 61/13 |
| 2022/0335721 A1* | 10/2022 | Brenner | G06V 20/60 |

* cited by examiner

RECOGNITION METHOD AND DEVICE FOR ANALYZING A STARVATION EXTENT OF A WHITELEG SHRIMP BASED ON UNDERWATER IMAGING

CROSS REFERENCE TO RELATED APPLICATION

This patent application claims the priority of Chinese Patent Application No. 202010286454.5, entitled "Recognition Method and Device for Analyzing a Starvation Extent of a Whiteleg Shrimp based on Underwater Imaging" filed with the Chinese Patent Office on Apr. 13, 2020, which is incorporated by reference herein in its entirety.

TECHNICAL FIELD

The present disclosure relates to the field of recognizing a starvation extent of a shrimp, in particular to a recognition method and device for analyzing a starvation extent of a whiteleg shrimp based on underwater imaging.

BACKGROUND ART

The whiteleg Shrimp, also known as Penaeus Vannamei and white prawn, is originated from warm waters along the pacific coast of Central and South America, and is an excellent species of intensive and high-yield culture. It is one of the three largest cultured shrimps in the world along with *Penaeus monodon* and *Penaeus chinensis*. In recent years, the whiteleg shrimp has gradually become an important cultivated shrimp species in China because of its fast growth, high-density culture tolerance, delicious meat and high meat content. In recent years, yield and scale of whiteleg shrimp culture industry in China has ranked first in the world, with an output of about 600,000 tons.

Although China is a big country for shrimp production, it is not a powerful country for shrimp culture. The culture technology and infrastructure of China are less developed, and the production efficiency and intensive degree in aquaculture are low. At present, China's culture technology and infrastructure is less developed, mainly involves in the unreasonable feed feeding and feeding amount basically dependent on personal experience of feeders. In general, due to a long feeding cycle of shrimp, it is not easy to observe specific feeding situation, and the feeders can only feed the shrimp roughly according to their experience. This method may cause unreasonable feed feeding, and once such situation occurs, it will not only cause feed waste, but also increase oxygen consumption, resulting in water pollution, infection rate increase, and thus the output and quality of aquatic products will be influenced. Therefore, in aquaculture, whether feeding is appropriate or not directly affects economic benefits of aquaculture. And, accurate determination of starvation extent of the shrimp is a premise of reasonable feeding. Therefore, a simple and effective method and device for recognizing starvation extent of the shrimp is particularly important for reasonable culture.

SUMMARY

In view of the existing problems in whiteleg shrimp culture, it is provided a recognition method and device for analyzing a starvation extent of whiteleg shrimp based on underwater imaging, which is configured to determine the starvation extent of the Shrimp, guide feeders to feed, and realize reasonable culture of Shrimp.

The present disclosure adopts the following technical solution.

It is provided a recognition device for analyzing a starvation extent of a whiteleg shrimp based on underwater imaging, including a bracket, a camera mounted on a top of the bracket, several light sources for illumination, and a processor connected with the camera.

The processor receives an image of shrimp collected by the camera, extracts an edge image of the shrimp after preprocessing the collected image, and calculates a movement speed of shrimp and a quantity of baits after recognizing a head and a tail of the shrimp, to recognize the starvation extent of the shrimp.

In some embodiments, the bracket is a cube structure, the camera is mounted at a center of the top of the bracket, the light sources are evenly distributed around the camera.

In some embodiments, wherein a bottom of the bracket is provided with a blue detection platform.

In some embodiments, the processor has a preprocessing unit for preprocessing the image, the preprocessing unit comprises:

an image segmentation unit, configured to segment the image by threshold, extract a region of interest where a body of the shrimp locates, and obtain a data of RGB three-color components of the shrimp; and a smoothing and de-noising unit, configured to apply to the segmented image, a median filtering and a subsequent thinning, as filtering process for the image.

In some embodiments, the processor further includes an edge extraction unit, which is configured to extract continuous edge points each with great difference in a gray value from surrounding pixel points in the preprocessed image.

In some embodiments, the processor further includes a head and tail recognition unit, which is configured to calculate a distance between any two edge points, determine two points between which a distance is the largest as head and tail end points, and crop images of edge portions near each of the edge points, and determine a head and a tail of the body of the shrimp according to widths of the cropped images.

In some embodiments, the processor further includes a recognition unit for the movement speed of shrimp and a quantity of baits, which is configured to compare a movement distance of the same body in two adjacent frame images to calculate the movement speed; compare the quantities of baits in two adjacent frame images to determine whether the quantity of baits increases.

It is also provided a recognition method for analyzing a starvation extent of a whiteleg shrimp based on underwater imaging, comprising steps of taking images of shrimp in waters by a camera, extracting an edge image of shrimp after preprocessing the image, calculating a movement speed of the shrimp and a quantity of baits after recognizing a head and a tail of the shrimp, to recognize a starvation extent of the shrimp.

In some embodiments, the method further includes:

Segmenting the Image: segmenting the image by threshold, extracting a region of interest where a body of the shrimp locates, and obtaining a data of RGB three-color components of the shrimp;

Smoothing and De-noising: applying to the segmented image a median filtering and a subsequent thinning, as a filtering process for the image.

In some embodiments, the extracting the edge image is to extract continuous edge points each with great difference in a gray value from the surrounding pixel points, in the preprocessed image.

The recognizing the head and the tail of the shrimp is to calculate a distance between any two edge points, and determine two points between which the distance is the largest as head and tail end points, and crop images of edge portions near each of the edge points, and determine the head and the tail according widths of the cropped images;

The calculating the movement speed of shrimp is to compare a movement distance of the same body in two adjacent frame images and calculate movement speed.

The calculating the quantity of baits is to compare the quantities of baits in two adjacent frame images and determine whether the quantity of baits increases.

The present disclosure can determine the starvation extent of the shrimp by capturing the image of the shrimp in real time, guide feeders to feed, and realize reasonable culture of the shrimp.

DETAILED DESCRIPTION OF THE EMBODIMENTS

The present disclosure will be described in detail in combination with the embodiments and the drawings, but the present disclosure is not limited thereto.

Embodiment 1

Figure 1:
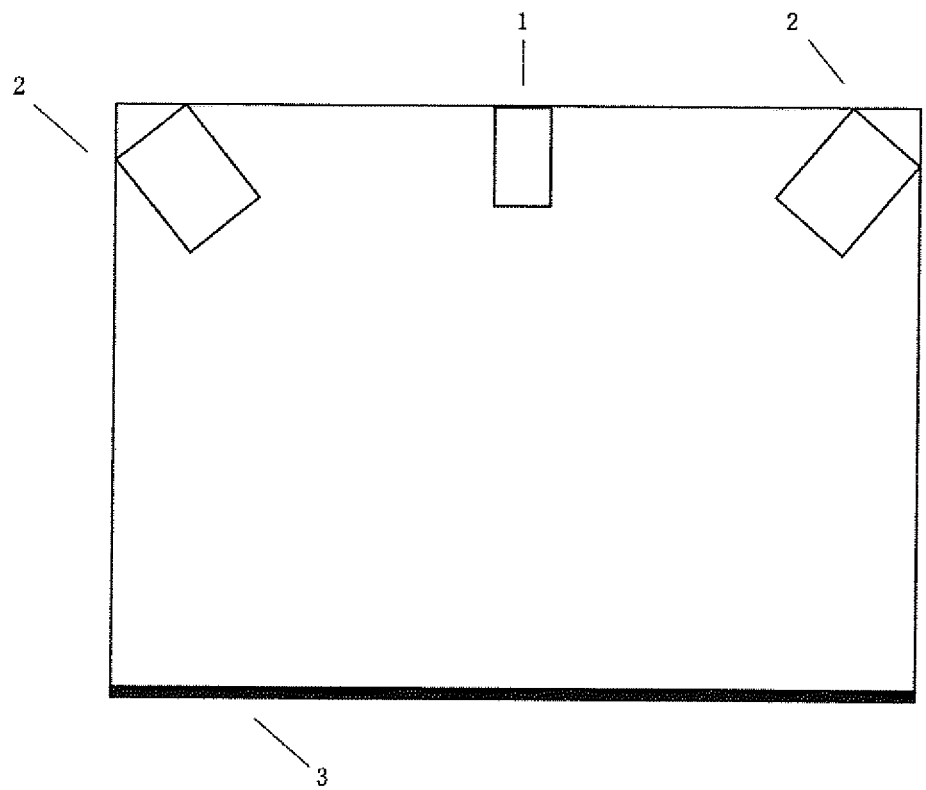
FIG. 1 is a structural diagram of a device according to the present disclosure.
Figure 2:
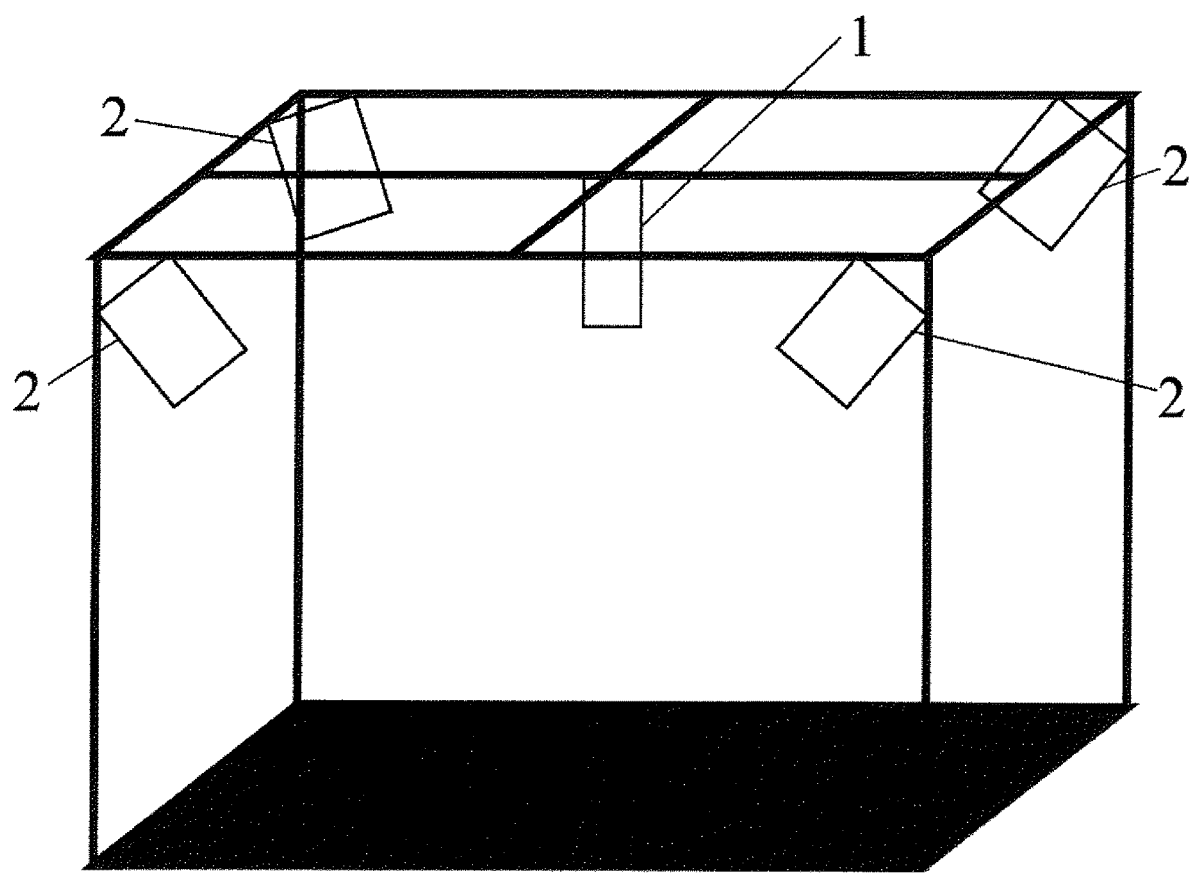
FIG. 2 is a perspective diagram of the device according to the present disclosure.

As shown in FIG. 1 and FIG. 2, a detection device includes a bracket with a cube structure. The camera 1 and a lens are located at a center of a top of the bracket and fixed by two cross bars. As the water is turbid, in addition to a natural light source, there are also special external enhanced light sources during an operation. Four light sources 2 are fixed on at four corners of the top of the bracket. A bottom of the bracket is a detection platform 3 with a color of blue.

The present disclosure adopts a monocular vision system, which uses a single camera to collect image information of a target object. The information collected by one camera is relatively simple and convenient in storage, includes small information quantity and is convenient and fast, enabling two dimensional information of shrimp body to be better obtained.

Considering particularity of underwater environment, a special underwater camera is used to obtain effective image information. Considering particularity of underwater environment in structure design, the camera is placed in a fully closed environment. The camera used in underwater environment adopts a watertight shell made of stainless steel alloy and is provided with prime lens to collect underwater image information.

The camera 1 is connected with a computer for processing the collected image, including the following operations of: receiving an image of a shrimp collected by the camera, extracting an edge image of the shrimp through preprocessing the collected shrimp image, and calculating movement speed of the shrimp and a quantity of baits after the head and the tail of the shrimp is recognized, so as to recognize a extent of starvation of the shrimp.

The processor in the embodiment includes an image segmentation unit, a smoothing and de-noising unit, an edge extraction unit, a head and tail recognition unit and a shrimp-movement-speed and bait-quantity recognition unit.

The image segmentation unit is configured to segment the shrimp image by threshold, extract a region of interest at which the shrimp body locates and obtain a data of RGB three-color components of the shrimp.

The smoothing and de-noising unit is configured to perform on the segmented image, a median filtering and a subsequent thinning, as filtering process for shrimp image.

The edge extraction unit is configured to, in the preprocessed images, extract continuous edge points each with great difference in a gray value from surrounding pixel points.

The head and tail recognition unit is configured to calculate a distance between any two edge points, determine two points between which the distance is largest as head and tail end points, and crop images of edge portions near each of the edge points, and determine a head and a tail of shrimp body according to the widths of the cropped portions.

The shrimp-movement-speed and bait-quantity recognition unit is configured to compare movement distance of the same shrimp body in two adjacent frame images, calculate a movement speed of the shrimp, compare bait quantities in two adjacent frame images, and determine whether the bait quantity increases.

Embodiment 2

It is provided a recognition method for analyzing a starvation extent of a whiteleg shrimp based on underwater imaging, including the following specific steps.

A Process for Recognizing Shrimp Body Direction and Calculating Speed of Shrimp Body:

(1) Segmenting an Image

Shrimp image is obtained in a white background, and a color of the shrimp body itself is dark and is significantly different from the color of the background. Thereby, a maximum inter-class variance (OTSU) is used for performing segmentation by threshold. After extracting the region of interest from an original image, the RGB three-color component data of the shrimp is obtained.

(2) Smoothing and De-Noising

In the process of image acquisition, due to the objective reasons such as equipment, environment and some characteristics of the object itself, most of original images have certain noise information. The disclosure adopts a spatial smoothing method by using a nonlinear smoothing filter, i.e., median filter, which has a basic principle that a pixel value of a certain point is replaced with a median of gray values in a certain range around the certain point.

The present disclosure adopts median filtering to perform image enhancement processing on the shrimp image. Three median filters respectively with window sizes 3×3, 5×5 and 8×8 are each applied to 500 binary shrimp images which have been segmented by threshold to test the effects of the median filters. It is found that as the filter window becomes larger, the image boundary becomes more blurred and the head and the abdomen in the image become smoother, but the processing time is longer. In order to maintain original features of the image as much as possible, and in consideration of the processing speed and practicability, median filtering with the window size 3×3, followed by the thinning process, is adopted as the filter processing for shrimp image.

(3) Extracting an Edge

Figure 3:
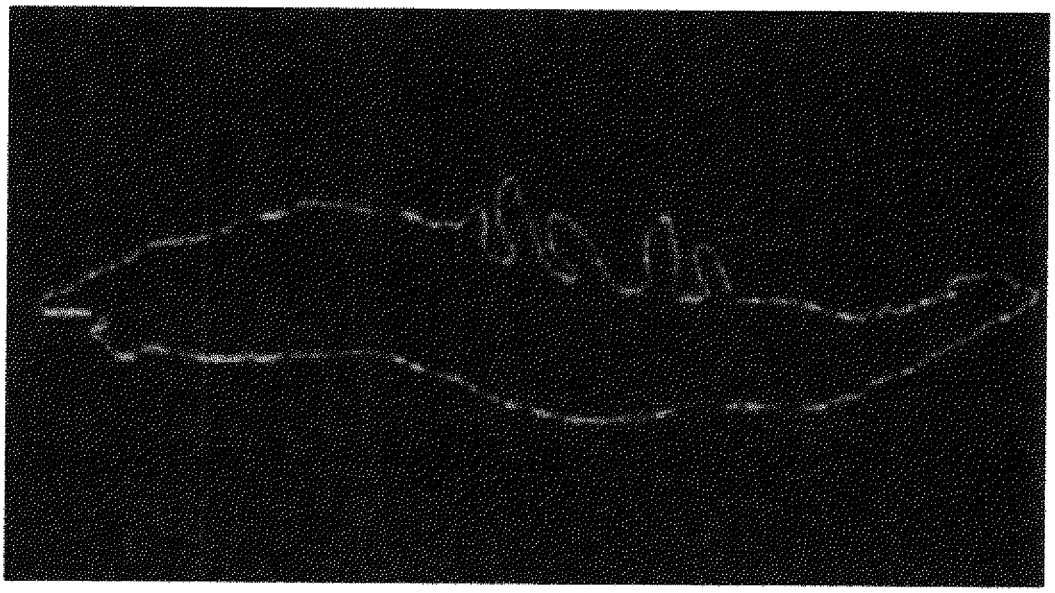
FIG. 3 is a diagram of an extracted edge of shrimp body.

First, an edge image of shrimp is obtained (as shown in FIG. 3) to determine the head and the tail of shrimp in the image. The edge of the target object is composed of a series of continuous points with great difference in the gray value from the surrounding pixel points. The edge extraction is to recognize these points, and uses a Sobel operator.

(4) Recognizing a Head and a Tail

Figure 4:
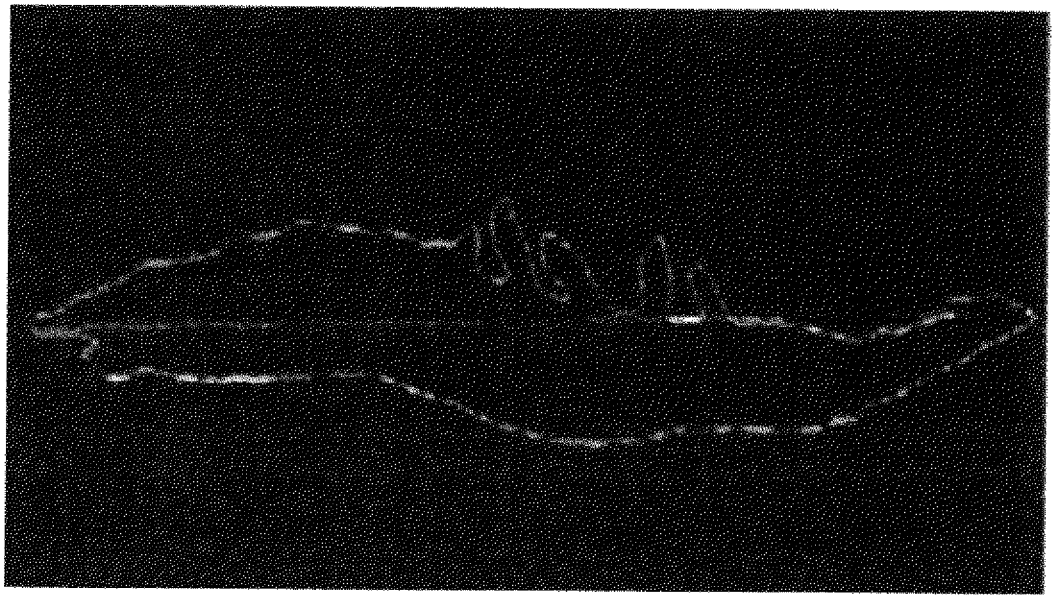
FIG. 4 is a diagram illustrating a determination of end points at a head and a tail of shrimp body.
Figure 5:
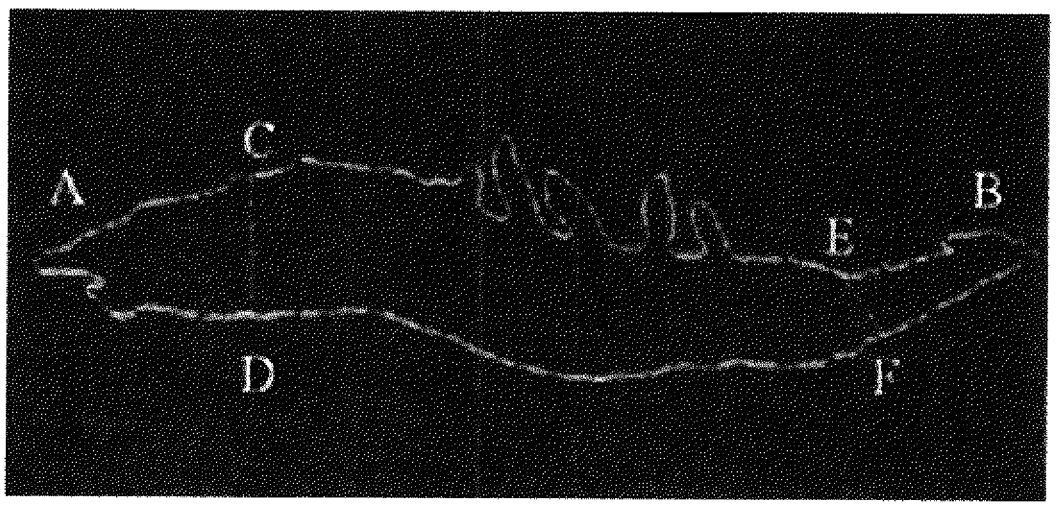
FIG. 5 is a diagram illustrating a determination of a width of the head and the tail of shrimp body.

By scanning the edge image, each pixel point is obtained, and distances between any two points are calculated. The two points between which there is the largest distance are the head and tail end points, as shown in FIG. 4. As shown in FIG. 5, in order to distinguish whether each of the two end points belong to the head or the tail, 20% of the edges are cropped from each of the two points, and the width of the cropped part is calculated. One with a larger width is the head, and the other one with a smaller width is the tail. A point A represents a head of the shrimp, a point B represents a tail of the shrimp, a line CD represents a connecting line close to the head of the shrimp, and a line EF represents a connecting line close to the tail of the shrimp.

(5) Calculating Movement Speed of Shrimp

The data of each frame is continuously read in turn, and then the data of a previous frame and a current frame are processed. Taking a point in the head as a reference point, a relative displacement coordinate of the reference point in the current frame relative to the same reference point in the previous frame is calculated. If a distance between the reference point in the previous frame and the same point in the current frame is less than 5 mm, skip directly and update the data of the previous frame. If the distance is greater than or equal to 5 mm, a straight line and a circle is drawn according to the previously obtained relative displacement coordinate to represent a current movement speed. Then X and Y are shown in the head, along with a relative movement distance between the reference point in the previous frame and the same point in a next frame, so as to calculate the movement speed.

A Process for Deter Mining a Quantity of Baits (1) Preprocessing an Image

Extracting target and smoothing and de-noising operations is implemented with a method similar to the step (1) and step (2) in the process for recognizing the direction of shrimp body and calculating speed.

(2) Recognizing Bait and Calculating a Quantity of Baits

The least-squares support-vector machine (LSSVM) is applied to bait recognition.

The parameters to be set in the application process of LSSVM include Gama and parameters associated with a kernel function of the LSSVM adopt radial basis function herein, which corresponds to a parameter sig2. After a recognition model is obtained, geometric feature parameters of the image to be recognized are extracted, and are input into the recognition model to realize the recognition and classification of the target object.

The quantity of baits in the image is calculated by the following formula:

$$D=\Sigma(d_1+d_2)$$

Wherein D is a total quantity of baits, D1 is a quantity of single floating baits and D2 is a quantity of cross floating baits.

The data of each frame is continuously read in turn, and then the quantities of baits in the previous frame image and the current frame image are calculated.

If a shrimp is detected, the speed of the detected shrimp is greater than 0.2 m/s, and the quantity of baits is reduced, the shrimp is hungry.

The above is only an embodiment of the present disclosure, which is not used to limit the present disclosure. Any modification, equivalent replacement, improvement and so on made within the spirit and principle of the present disclosure shall be included in the protection scope of the present disclosure.

What is claimed is:

1. A recognition device for analyzing a starvation extent of a whiteleg shrimp based on underwater imaging, comprising a bracket, a camera mounted on a top of the bracket, a plurality of light sources for illumination, a memory storing program codes, and a processor connected with the camera, the processor executing the stored codes for:
   receiving an image of shrimp collected by the camera, extracting an edge image of the shrimp after preprocessing the collected image, and calculating a movement speed of shrimp and a quantity of baits after recognizing a head and a tail of the shrimp, to recognize the starvation extent of the shrimp; and
   calculating the movement speed of the shrimp is comparing a movement distance of a same body in two adjacent frame images based on ethological features of the shrimp; and calculating the quantity of baits is comparing the quantities of baits in two adjacent frame images to determine whether the quantity of baits increases.

2. The recognition device according to claim 1, wherein the bracket is a cube structure, the camera is mounted at a center of the top of the bracket, the light sources are evenly distributed around the camera.

3. The recognition device according to claim 1, wherein a bottom of the bracket is provided with a blue detection platform.

4. The recognition device according to claim 1, wherein the processor executing the stored codes for:
   segmenting the image by threshold, extracting a region of interest where a body of the shrimp locates, and obtaining a data of RGB three-color components of the shrimp; and
   applying to the segmented image, a median filtering and a subsequent thinning, as filtering process for the image.

5. The recognition device according to claim 1, wherein the processor further executing the stored codes for extracting continuous edge points each with great difference in a gray value from surrounding pixel points in the preprocessed image.

6. The recognition device according to claim 1, wherein the processor further executing the stored codes for calculating a distance between any two edge points, determining two points between which a distance is the largest as head and tail end points, and cropping images of edge portions near each of the edge points, and determining a head and a tail of the body of the shrimp according to widths of the cropped images.

7. A recognition method for analyzing a starvation extent of a whiteleg shrimp based on underwater imaging, comprising:
   taking images of shrimp in waters by a camera, extracting an edge image of shrimp after preprocessing the image, calculating a movement speed of the shrimp and a quantity of baits after recognizing a head and a tail of the shrimp, to recognize a starvation extent of the shrimp;

calculating the movement speed of the shrimp is comparing a movement distance of a same body in two adjacent frame images based on ethological features of the shrimp; and calculating the Quantity of baits is comparing the quantities of baits in two adjacent frame images and determine whether the quantity of baits increases.

8. The recognition method according to claim 7, further comprises:

segmenting the image by threshold, extracting a region of interest where a body of the shrimp locates, and obtaining a data of RGB three-color components of the shrimp;

applying to the segmented image a median filtering and a subsequent thinning, as a filtering process for the image.

9. The recognition method according to claim 7, wherein:

the extracting the edge image is to extract continuous edge points each with great difference in a gray value from the surrounding pixel points, in the preprocessed image; and the recognizing the head and the tail of the shrimp is to calculate a distance between any two edge points, and determine two points between which distance is the largest as head and tail end points, and crop images of edge portions near each of the edge points, and determine the head and the tail according widths of the cropped images.

* * * * *